United States Patent [19]

Jäger

[11] Patent Number: 5,462,495
[45] Date of Patent: Oct. 31, 1995

[54] ROLLER BELT ARRANGEMENT FOR CATERPILLAR TRACK-TYPE VEHICLES

[76] Inventor: Arnold Jäger, Gehrbergsweg 6, D-31303 Burgdorf, Germany

[21] Appl. No.: 316,238

[22] Filed: Sep. 30, 1994

[30] Foreign Application Priority Data

Oct. 1, 1993 [DE] Germany .............. 43 33 602.7

[51] Int. Cl.$^6$ .................................................. F16G 1/00
[52] U.S. Cl. .................................. 474/209; 305/35 EB
[58] Field of Search ........................ 474/204, 209, 474/238, 901, 902; 305/35 EB; 198/803.8, 835

[56] References Cited

U.S. PATENT DOCUMENTS

| | | | |
|---|---|---|---|
| 2,338,550 | 1/1944 | Sloman et al. | 474/204 X |
| 4,145,092 | 3/1979 | Kasin | 305/35 EB |
| 4,795,408 | 1/1989 | Kotegawa et al. | 474/209 |
| 5,015,219 | 5/1991 | Jager . | |
| 5,201,574 | 4/1993 | James et al. | 305/35 EB |

Primary Examiner—Michael Powell Buiz
Attorney, Agent, or Firm—Robert W. Becker & Associates

[57] ABSTRACT

A roller belt arrangement for a caterpillar track-type vehicle, especially a snowmobile. The arrangement has one or more inextensible belts that extend parallel to one another and to which transversely extending drivers or grippers are secured with the aid of screw bolts that extend through the belts and a base of the driver or gripper. The base has a U-shaped cross-sectional shape, including two legs that extend essentially perpendicular to the belt and a crosspiece that connects the legs and extends parallel to a plane of the belts and is adapted to rest thereagainst. An elastomeric cushion member is provided that rests against the crosspiece on the side thereof remote from the belts. An abutment member is disposed on an end of the screw bolt facing the driver or gripper, with the cushion member being disposed between the abutment member and the crosspiece.

14 Claims, 3 Drawing Sheets

ROLLER BELT ARRANGEMENT FOR CATERPILLAR TRACK-TYPE VEHICLES

BACKGROUND OF THE INVENTION

The present invention relates to a roller belt arrangement for a caterpillar track-type vehicle, especially a snowmobile, having one or more inextensible belts that extend parallel to one another and to which transversely extending driver or gripper means are secured with the aid of securing means in the form of bolts, screws or rivets that extend through the belts and a base of the driver or gripper means, such base having a U-shaped cross-sectional shape, with the two legs of the base extending essentially perpendicular to the belts, and with the crosspiece that connects the legs extending in the longitudinal direction of the arrangement.

With heretofore known roller belt arrangements of this general type, that end of the securing means that faces the driver or gripper means is provided with threads for receiving a nut that rests against the crosspiece of the driver or gripper means. When heavy loads are encountered, and also when the load or stress lasts for a long time, the danger exists that the securing means can break or fail in the vicinity of the transition to the driver or gripper means, with such failure being caused by stress concentration and shearing effects.

It is therefore an object of the present invention to improve a roller belt arrangement of the aforementioned general type in such a way that failure or premature wear of the securing means is at least to a great extent reduced, and hence securement of the driver or gripper means is ensured.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
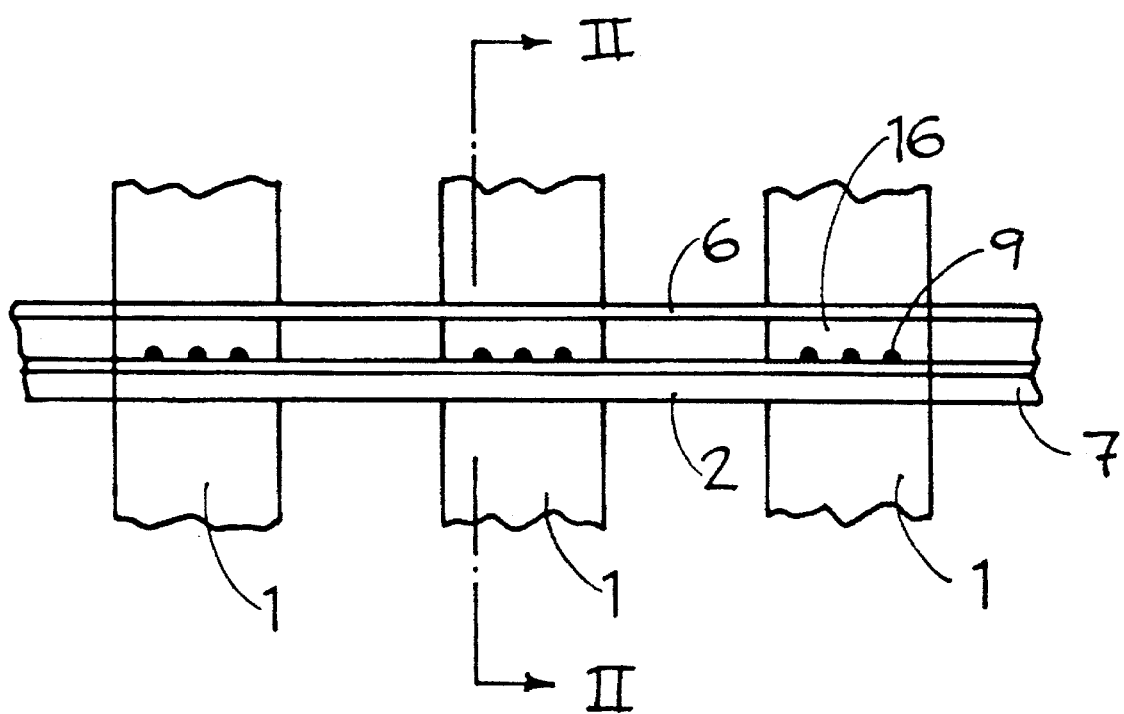
FIG. 1 is a partial view of one exemplary embodiment of the inventive roller belt arrangement for a caterpillar track-type vehicle for use in the snow and is taken toward the ground surface contact side.

The roller belt arrangement of the present invention is characterized primarily in that that end of the securing means that faces the driver or gripper means is provided with an abutment member for an elastomeric cushion member of rubber or rubber-like material, with this cushion member being supported against the cross-piece of the base of the driver or gripper means. The cushion member is preferably preloaded, which, if the securing means is a screw bolt, can be accomplished by tightening the nut of the bolt or by screwing the bolt into the abutment member. The cushion member expediently has such a dimension that in the installed state, it partially fills the U-shaped base of the driver or gripper means. Furthermore, the hole in the crosspiece of the driver or gripper means for the securing means is preferably dimensioned in such a way that it is slightly larger than the diameter of the securing means.

The inventive cushion member leads to a nonrigid but rather resilient stressing of the securing means, thereby protecting the securing means from stress concentration and shearing effects; in addition, the driver or gripper means can also advantageously carry out a certain deflection movement when it is stressed without thereby losing its ability to provide traction.

The inventive cushion member is disposed within the base of the driver or gripper means and is therefore accommodated in a protected manner. In order under these conditions to be able to provide for an elastic deformability of the elastomeric cushion member, for example the preloading of the cushion member, the latter is provided with recessed portions that become smaller with the preload or other stressing action or are filled in by the displaced or expanding rubber.

It is furthermore also advantageous for the inventive cushion member and the pertaining abutment member at the end of the securing means to be dimensioned in such a way that both of these members at least practically fill the U-shaped base of the driver or gripper means.

The driver or gripper means is, in a known manner, embodied in such a way that one of the two legs of the U-shaped base form the actual gripper or driver portion, and in particular via an appropriate extension or lengthening of that leg.

Further specific features of the present invention will be described in detail subsequently.

DESCRIPTION OF PREFERRED EMBODIMENTS

Referring now to the drawing in detail, the roller belt arrangement is essentially formed from five (only three are illustrated) inextensible, flexible, continuously rotating belts 1 that extend parallel to one another. The belts are guided on wheels of the vehicle and serve for the mounting and securement of transversely disposed driver or gripper means 2 that are intended to ensure a positive drive in snow. The driver means 2 extend over the entire width of the roller belt arrangement and span the gaps between the belts 1.

The belts 1 have an inextensible core 3 in the form of superimposed rubberized fabric layers as square-woven fabric. The top and bottom of the core 3 is covered by a protective cover layer 4 of rubber that is secured thereto.

The driver or gripper means 2 comprise a steel section having a U-shaped base that serves for anchoring the gripper means. The base has a crosspiece 5 that extends parallel to the belt 1 and rests thereagainst, with legs 6 extending at right angles from the crosspiece 5. One of the legs 6 is extended to form the actual gripper or driver portion 7. The crosspiece 5 has three spaced-apart holes 8 for receiving screw bolts 9 that extend through a hole 10 in the belt 1 and on the inner side of the belt 1 extend through a metal strip 11 that has angled-off edges 12.

Figure 2:
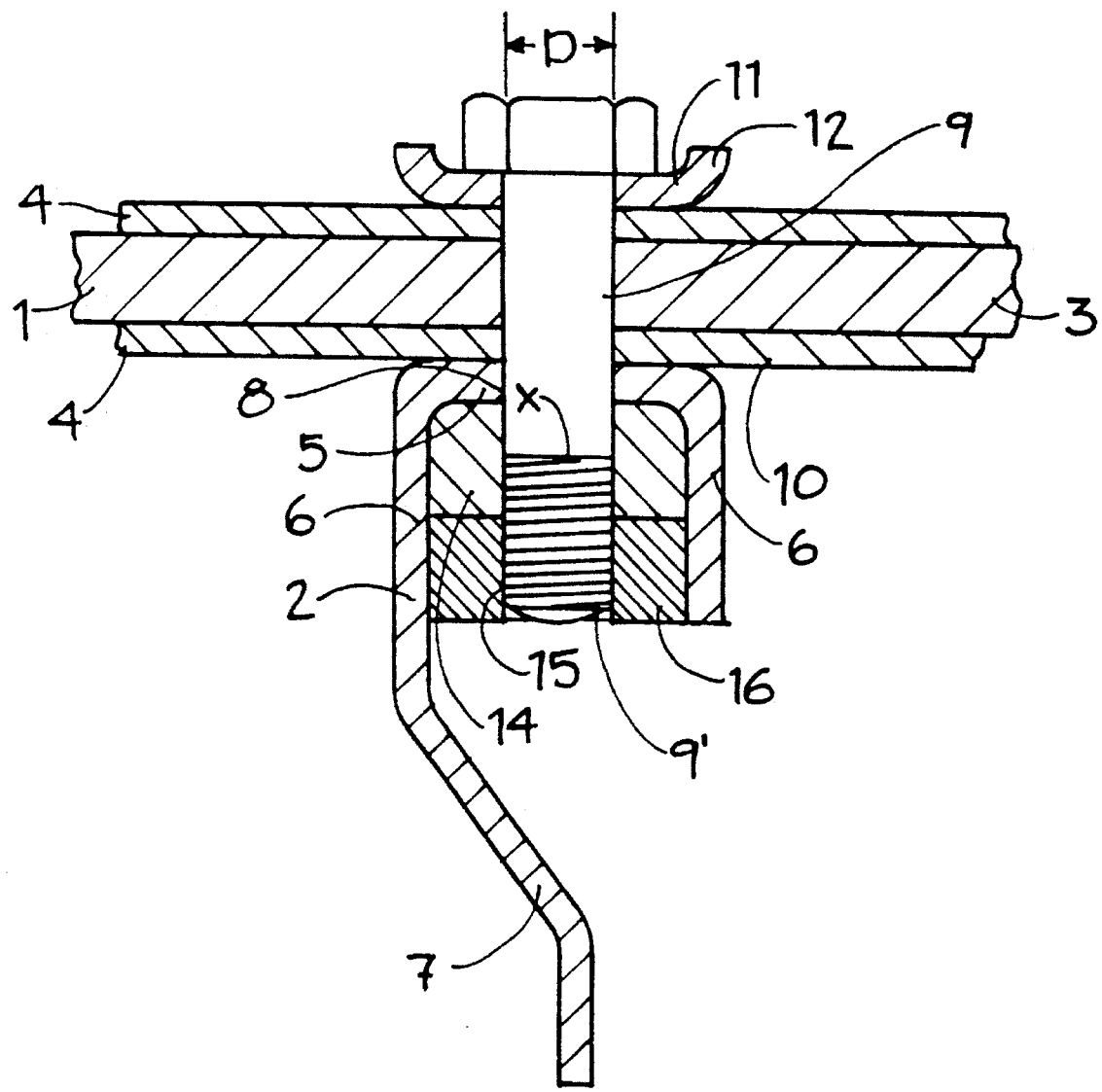
FIG. 2 is a cross-sectional view taken along the line II—II in FIG. 1.
Figure 3:
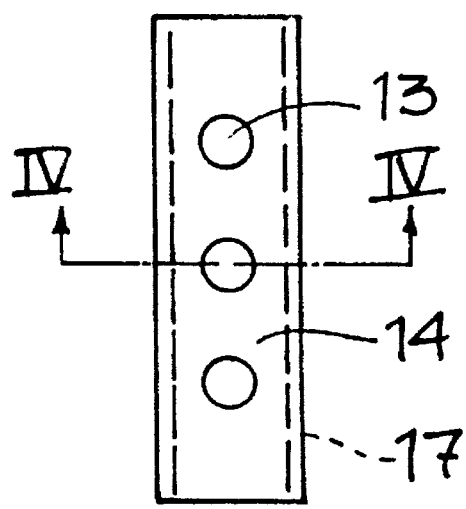
FIG. 3 shows a rubber cushion member for the roller belt arrangement of FIG. 1.
Figure 4:
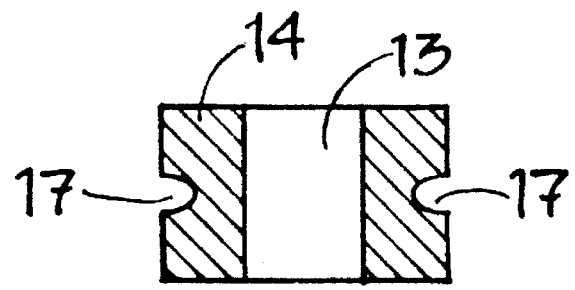
FIG. 4 is a cross-sectional view of the cushion member of FIG. 3 taken along the line IV—IV thereof.

The free ends of the screw bolts 9 are furthermore guided through holes 13 of a rubber strip 14 and are screwed into threaded holes 15 of a steel bar 16. The components 14, 16 have a length that corresponds to the distance spanned by the belts 1, and together fill the space between the two legs 6 and the crosspiece 5 of the base of the driver or gripper means 2. In addition, the two sides of the rubber strip 14 are provided with longitudinally extending notches or grooves 17. These notches permit an elastic deformation as the screw bolts 9 are screwed further and further into the threaded holes 15 of the bar 16. This deformation can be continued to such an extent that the two notches 17 become smaller or, as illustrated in FIG. 2, become completely filled in due to the deforming or stretching rubber, with there still being space for the deforming rubber to spread at the end faces of the strip 14.

By interposing a strip 14 between the end of the screw bolt 9 with the bar 16 that serves as an abutment on the one hand, and the crosspiece 5 on the other hand, an elastic mounting of the driver or gripper means 2 is provided, especially if the back sides of the crosspieces 5 rest against the protective rubber cover layer 4. An even more advantageous mounting for avoiding breakage or failure of the screw bolt 9 consists in making the diameter of the hole 8 in the crosspiece 5 about 5–15% greater than the diameter of the shaft of the screw bolt 9. This diameter is indicated by D in FIG. 2. With such a provision of the diameters, the gripper or driver portions 7 can carry out slight tilting movements relative to the belts 1. These tilting movements are, however, elastically cushioned and limited by the strip 14.

In principle, it is also possible to utilize for each bolt 9 a nut-like structure that extends over the space between the two legs 6. However, for reasons of stability and to contain the strip 14, it is more advantageous to use a bar 16 that extends over the length of the strip 14, i.e. over the overall width of the belts 1. It is also not absolutely necessary to dispose the displacement or spreading spaces in the form of notches 17 on the outer sides of the strip 14; rather, such displacement spaces can also be disposed on other outer surfaces, or can even be hollow spaces.

The favorable effect resulting from the inventive configuration can be attributed to the fact that at the free end of the screw bolt 9, in a direction toward the threaded holes 15, due to the presence of the elastomer (the strip 14) from a strength or stability and also resilience standpoint, rather than an abrupt transition a gradual transition results that to a large extent precludes the aforementioned failure of the bolt.

With respect to such avoidance of bolt failures, it is furthermore advantageous if the transition "x" between the smooth, cylindrical, non-scored shaft of the bolt 9 and the portion 9' that is provided with the thread be disposed in the region of, i.e. at the level of, the strip 14. In particular, as illustrated in FIG. 2, this transition "x" should be disposed about half way through the cushion or strip 14.

The present invention is, of course, in no way restricted to the specific disclosure of the specification and drawing, but also encompasses any modifications within the scope of the appended claims.

What I claim is:

1. In a roller belt arrangement, for a caterpillar track-type vehicle, having one or more inextensible belts that extend parallel to one another and to which transversely extending driver or gripper means are secured with the aid of securing means in the form of bolts, screws or rivets that extend through said belts and a base of said driver or gripper means, said base having a U-shaped cross-sectional shape, including two legs that extend essentially perpendicular to said belts and a crosspiece that connects said legs and extends parallel to a plane of said belts and is adapted to rest thereagainst, the improvement wherein:

an elastomeric cushion member is provided that rests against said crosspiece on a side thereof remote from said belts; and an abutment member is disposed on an end of said securing means facing said driver or gripper means, with said cushion member being disposed between said abutment member and said crosspiece of said base of said driver or gripper means.

2. A roller belt arrangement according to claim 1, wherein said crosspiece of said base of said driver or gripper means is provided with respective holes that each receive a respective securing means with play.

3. A roller belt arrangement according to claim 2, wherein said hole of said crosspiece has a diameter that is about 5–15% greater than a diameter of said securing means.

4. A roller belt arrangement according to claim 1, wherein said cushion member and said abutment member have a width that corresponds at least essentially to the space between said two legs of said base of said driver or gripper means.

5. A roller belt arrangement according to claim 4, wherein said cushion member and said abutment member at least substantially fill said U-shaped base of said driver or gripper means.

6. A roller belt arrangement according to claim 4, wherein said cushion member, in a non-deformed state, is provided with one or more recessed portions or hollow spaces that when a pressure deformation is caused by said securing means are entirely or partially eliminated or reduced.

7. A roller belt arrangement according to claim 5, wherein said recessed portions are longitudinally extending notches provided in side surfaces of said cushion member.

8. A roller belt arrangement according to claim 1, wherein said cushion member and said abutment member essentially extend over an overall width of said belts.

9. A roller belt arrangement according to claim 1, wherein said securing means is a screw bolt, and said cushion member is preloaded via a tightening or drawing-in of said screw bolt.

10. A roller belt arrangement according to claim 8, wherein the elastomeric material of said cushion member is freely deformable at end faces of said cushion member that are disposed in the vicinity of edge portions of said arrangement.

11. A roller belt arrangement according to claim 9, wherein said abutment member is provided with one or more holes for receiving respective ones of said securing means.

12. A roller belt arrangement according to claim 11, wherein said holes of the abutment member are threaded holes.

13. A roller belt arrangement according to claim 12, wherein said screw bolt has a threaded portion for engaging one of said threaded holes of said abutment member, with a transition between a non-threaded smooth shaft of said screw bolt and said threaded portion thereof being disposed in the region of said cushion member.

14. A roller belt arrangement according to claim 13, wherein said transition is disposed about half way through said cushion member.

* * * * *